United States Patent [19]
Malofsky et al.

[11] Patent Number: 5,702,120
[45] Date of Patent: *Dec. 30, 1997

[54] ROLLABLE CHILD CARRIER STRUCTURE

[75] Inventors: Adam G. Malofsky, Huntington; Bernard M. Malofsky, Bloomfield, both of Conn.; Paul R. Glassberg, Chester, N.J.

[73] Assignee: Piccolino, LLC, Huntington, Conn.

[*] Notice: The term of this patent shall not extend beyond the expiration date of Pat. No. 5,533,215.

[21] Appl. No.: 501,505

[22] Filed: Aug. 9, 1995

[51] Int. Cl.[6] ................................................ A63C 9/00
[52] U.S. Cl. ................................ 280/642; 280/650
[58] Field of Search ........................ 280/642, 650, 280/639, 38, 641, 644, 649, 651, 657, 658; 297/DIG. 4; 524/494, 496, 404; 525/240

[56] References Cited

U.S. PATENT DOCUMENTS 5,205,578  4/1993  Liu .
5,533,215  7/1996  Malofsky ............................ 5/99.1

Primary Examiner—Brian L. Johnson
Assistant Examiner—Jonathan E. Butts
Attorney, Agent, or Firm—William A. Simons; Wiggin & Dana

[57] ABSTRACT

A rollable child carrier structure comprising a rollable base and a multi-side enclosing frame, wherein said frame comprises tubing sections made of lightweight, high modulus fiber-reinforced plastic matrix composite tubing having a weight of 0.35 pounds or less per lineal foot, and wherein said plastic matrix is a thermoplastic resin or thermoset plastic resin with a minimum modulus of 250,000 psi; a minimum tensile strength of 6,000 psi; and a glass transition temperature of at least 50° C. and wherein said high modulus fiber reinforcement is selected from the group consisting of carbon fibers, aramid fibers, glass fibers, polyolefin fibers, boron fibers, and mixtures thereof.

18 Claims, 2 Drawing Sheets

ROLLABLE CHILD CARRIER STRUCTURE

BACKGROUND OF THE INVENTION

1. Field of Invention

The present invention relates to stroller or baby carriages ("rollable child carrier structure") that are constructed of a novel composite material.

2. Brief Description of the Art

Numerous patents are directed to the design and specific materials for strollers and baby carriers. Most involve the use of steel or aluminum frames.

U.S. Pat. No. 5,205,578 involves the use of injected molded; thermoplastic material in strollers. However, certain problems exist with the use of this material in strollers and baby carriages.

These problems include (1) the use of very expensive molding operations and capital costs; (2) the resins specifically cited (i.e., polypropylene and nylon) cannot carry the required loads without massive distortion of the stroller or carriage frame over time or during use unless special and non-readily available thermoplastic resins are used; (3) any thermoplastic resin currently available that can carry the loads without distortions (e.g., polycarbonate resins) are expensive and very difficult to process; (4) thermoplastic resins are generally difficult to paint or coat because of their inherent low surface tension; (5) a plastic stroller annotates a cheaply made item vis-a-vis comparable shaped metal materials; and (6) the use of thermoplastic material that does not distort will have to be very thick.

Thus, a need exists for a stroller or baby carriage made out of a better material than metals or injection molded plastic materials. The present invention meets that need.

BRIEF SUMMARY OF THE INVENTION

Specifically, one aspect of the present invention is directed to a child or infant rollable carrier structure comprising a rollable base and a multi-side enclosing frame wherein said frame comprises tubing sections made of lightweight, high modulus fiber-reinforced plastic matrix composite tubing having a weight of 0.35 pounds or less per lineal foot, a tubing diameter of 0.2 to 1.5 inches; a tubing thickness of 0.03 to 0.15 inches; and a single fiber angle of 20° to 50° and fabricated from a single tow or at least one sheet of fibers.

A second aspect of the present invention is directed to a folding baby carriage frame assembly which comprises a handle, a back support frame, one pair or side frames, a rear wheel frame, a front wheel frame, foot pedal lever, one pair of folding links, and two springs;

said handle including two parallel side rods, a corrugated hand-hold portion connected between respective ends of said parallel side rods and a cross rod connecting said two parallel side rods and spaced from said corrugated hand-hold portions, a canopy frame pivotally connected to said side rods by a pair of holes, a first upper pair of cushions pivotally connected to first respective ends of said side frames by rivets, an intermediate pair of cushions pivotally connected to said folding links, a pair of projecting blocks, and a first lower pair of cushions pivotally connected to said rear wheel frame by rivets;

said back support frame having two adjustment sheet formed at opposite ends thereof respectively connected to said projecting blocks of said handle;

said rear wheel frame having a second upper pair of said frames by rivets, a pair of connecting sheets pivotally connected to said front wheel frame, a second lower pair of cushions pivotally connected to said pair of folding links by rivets, a bottom including a transverse rear wheel axle, two rear wheels mounted at two opposite ends of said rear wheel axle and secured in place by locknuts;

said pair of folding links having stub rods; one end of said pair of folding links respectively pivoted to said first intermediate cushions of said handle, an intermediate part thereof respectively pivoted to said second lower cushions of said rear wheel frame, and an opposite end thereof respectively pivoted to said front wheel frame;

said front wheel frame having two opposite ends respectively connected to said connecting sheets of said rear wheel frame, a third pair of lower cushions respectively pivoted to said pair of folding links at said opposite end thereof, and a bottom including a transverse front wheel axle, two front wheels are mounted at two opposite ends of said front wheel axle and secured in place by locknuts;

said foot medal lever having two locating plates at opposite ends thereof, each said locating plate having a retaining notch thereon respectively hooked on said stub rods of said pair of folding links; said two springs being respectively connected between said locating plates of said foot pedal lever and said adjustment sheets of said back support frame;

wherein said handle, said parallel side rods, said cross rods, said back support frame, said rear wheel frame and said connecting sheets, said transverse wheel axle, said front wheel frame, said side frames and said folding links are made of lightweight, high modulus fiber-reinforced plastic matrix composite tubing having a weight of 0.35 pounds or less per lineal foot, a tubing diameter of 0.2 to 1.5 inches, a tubing thickness of 0.03 to 0.15 inches, a single fiber angle of 20° to 50°, and fabricated from a single tow or at least one sheet of fibers.

BRIEF DESCRIPTION OF THE DRAWINGS

The present invention may be better understood by reference to the following detailed description and to the accompanied drawings in which.

DETAILED DESCRIPTION OF THE PREFERRED EMBODIMENTS

Figure 1:
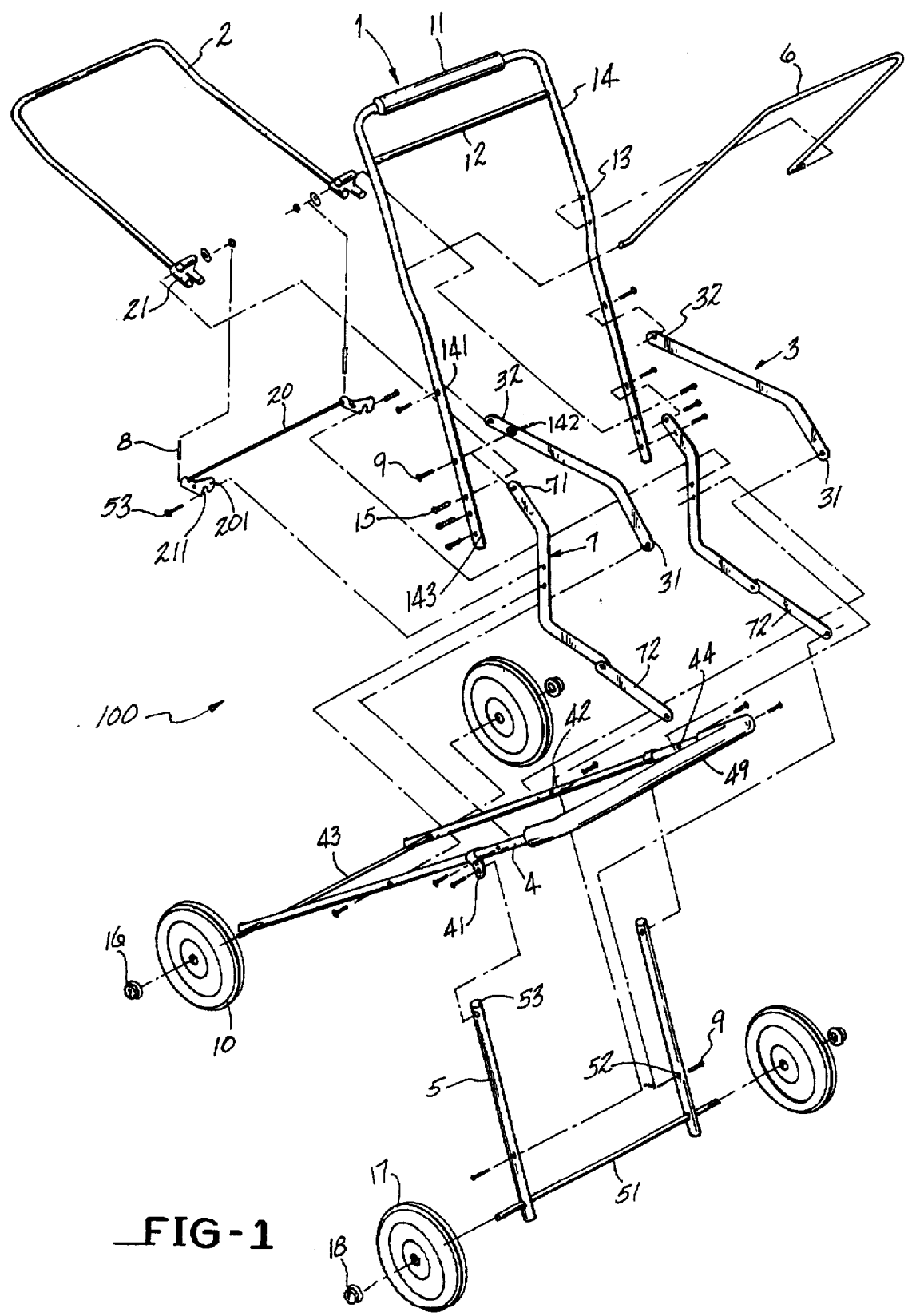
FIG. 1 is an exploded view of one preferred embodiment of a folding baby carriage frame assembly of the present invention.

The term "composites" as used in the present specification and claims is defined as those materials found by distributing extremely strong and stiff, continuous, chopped, or a mixture of fibers in a polymer resin matrix or binder.

The term "high modulus fiber reinforcement" as used in the present specification and claims is defined as a collection of fibers employed possessing an average modulus of at least 5,000,000 psi, preferably 15,000,000 psi, and most preferably at least 30,000,000 psi.

The term "plastic resin matrix or binder" as used in the present specification and claims is defined as any thermoset or thermoplastic resin with a minimum modulus of about 250,000 psi, preferably about 325,000 psi, and most preferably, at least about 400,000 psi; a minimum tensile strength of about 6,000 psi, preferably about 10,000 psi, and most preferably at least about 12,000 psi; and glass transition temperature (Tg) of at least about 50° C., preferably at least about 75° C., and most preferably, at least about 100° C.

Preferred examples of higher modulus fiber reinforcement material include carbon fibers, aramid fibers, glass fibers, polyolefin fibers, boron fibers, and the like. Most preferred is carbon fibers alone or with combination with other fibers.

Preferred examples of the plastic resin matrix or binder include plastic resins such as nylon, high-strength polyethylene, liquid crystalline polyethylene, epoxy resins, cyanurates, polyesters, and polyurethanes and the like. Most preferred is epoxy-type thermoset resins and nylon-type thermoplastic resins.

Generally, the high modulus fibers used herein are typically at least about 50 times stronger and at least about 20–150 times stiffer than the plastic resin matrix used herein. The role of the matrix is primarily that of a glue or binder that enables the high modulus fibers to support the applied loads.

In the composites used in the present invention, the ratio of high modulus fibers to plastic resin mixture is preferably from 30:70 to 70:30 by volume, more preferably, 40:60 to 60:40 by volume.

Fiber angles of the composite tubing may be either a combination of high and low angles to the axis of the tube to impart maximum rigidity and strength per unit weight or a single angle for ease of manufacturing and lower cost. If a combination of fibers is used, the angle combination should be preferably isotropic winding angles. In the case of tubing made from a single tow with a single angle, the preferred angle should fall between 20° and 50°, more preferably from 25° to 45°, and most preferably from 30° to 40°.

Overall tubing weight should be no more than 0.35 pounds per lineal foot, preferably no more than 0.17 pounds per lineal foot, and most preferably no more than 0.10 pounds per lineal foot. In the case of filament would tubing made from a single tow of fiber wound with a single angle, the above preferred weight per lineal foot, the preferred diameter is 0.2 to 1.5 inches, more preferable 0.2 to 0.9 inches, and most preferably 0.4 to 0.8 inches. In the case of tubing with the above preferred weight per lineal foot and the preferred tubing diameter, the preferred tubing wall thickness is 0.03 to 0.15 inches, more preferably 0.04 to 0.09 inches, and most preferably 0.05 to 0.07 inches.

The high modulus fibers and plastic resin matrix or binder combined to form composites used in the present invention by any standard composite fabrication technique. Filament winding is one technique of single tow tube construction when maximum lightness and continuous fiber reinforcements are needed along with maximum superior strength and stiffness for a given fiber volume fraction. Alternatively, the single tow construction technique may be pultrusion, injection molding, or any other standard composite one tow tubular construction technique. Another alternative construction is roll wrapping wherein the high modular fibers and plastic resin matrix or binder are in the form of one sheet (commonly called "flags") that is shaped into the tubing. Also, the present invention encompasses the use of the above-noted composites with additional tubular material, such as a composite covering an ultrathin tube or plastic tube. The present invention also encompasses the use of the above-noted composites in tapered shafts (i.e., wherein one end of the tubing has a larger diameter than the other end).

The composite tubings of the present invention as well as the connective fittings, supports, and folding mechanisms described herein may be made of any suitable materials, including molded plastics containing lightening fillers, such as microballoons and other low-density fillers, whose density is no more than 0.9 grams per cubic centimeter.

This invention has many unique and significant advantages over the prior art. In contrast to using either metal, thermosetplastic tubing, or thermoplastic tubing, using high modulus fiber plastic matrix reinforced composite tubing results in a dramatic reduction in frame weight without a loss of strength. This weight loss, without a loss in strength, provides for a stroller or baby carriage that can be easily and conveniently folded, stored, and carried. The use of high modulus fiber plastic matrix reinforced composite tubing or rods, versus high modulus fiber plastic matrix reinforced composite tubing or rods, versus high modulus fiber plastic matrix reinforced composite plates, mesh, or other form allows for weight minimization that would not otherwise be possible. The dramatic weight reduction coupled with the tubular form also allows for the use of less dramatic weight loss coupled with the tubular form also allows for the use of less strong and lighter connective fixtures and hinges. Long, high modulus fiber/plastic matrix reinforced composites are desired over short, high modulus fiber plastic matrix reinforced composites because of their overall superior strength and stiffness. Oriented, long, high modulus fiber plastic matrix reinforced composites are even more preferred because of their even more superior strength and stiffness. Additionally, high modulus fiber plastic matrix reinforced composites, because of their high stiffness, dimension stability, and acoustic properties, do not dampen or significantly distort sound. Accordingly, unlike unreinforced plastics or short, high modulus fiber/plastic matrix reinforced composites, high modulus fiber plastic matrix reinforce composites have metal-like properties and infer a quality appearance. Unlike metals and more easily than most plastics, composites may be readily coated for decorative purposes and will not corrode. This invention further improves upon the construction of tubing made from fiber-reinforced plastic matrix composites. It has been found that certain types of constructions are more economical, re faster to produce, see less complex to manufacturer, minimize the amount of material used, and yet the final tubing still exhibits all of the desired properties. Specifically, a construction which utilized a single tow of fibers and a single fiber angle in the weave of the fibers within the tube is one of the most economical, fast, and least complex. In this invention, we have found that only certain angles of fiber for the desired specifications of the tubing will favor the desired tubing properties. Using angles outside of this range when only a single amount is utilized will produce tubing that will fail to perform as desired or that will fail to fall within the desired tubing specifications if the desired performance is achieved. These fiber angles generally fall between 20° and 50°. The use of multiple angles outside of this range can overcome some of these shortfalls, as has been previously described, but the manufacturing process is more complex, less favorable, is more expensive, and more time consuming.

Figure 2:
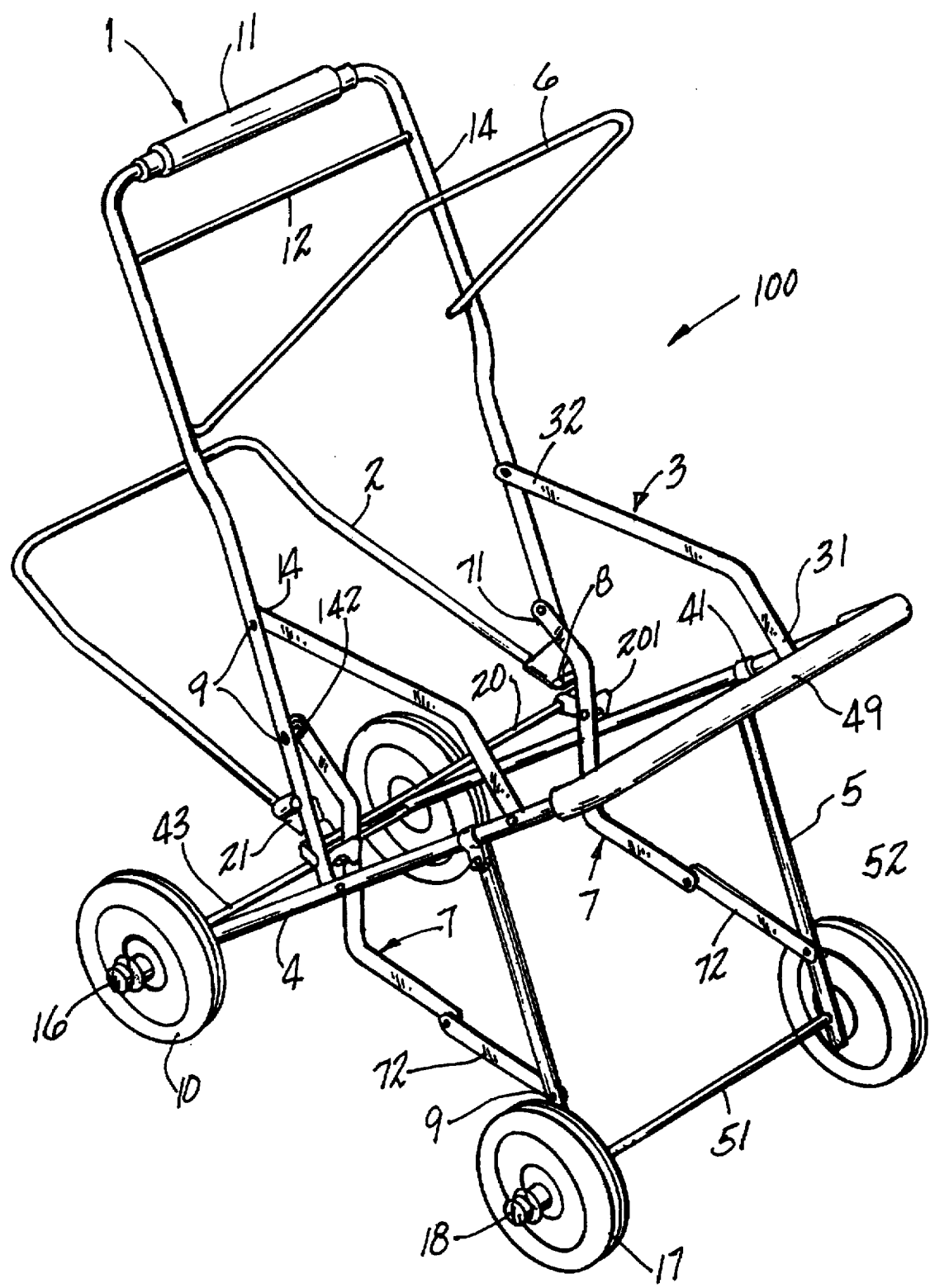
FIG. 2 is an elevational view of the preferred embodiment of the folding baby carriage frame assembly of the present invention.

Referring to FIGS. 1 and 2, therein illustrated is a folding baby carriage frame assembly 100 according to the present invention, which is generally comprised of a handle 1, a back support frame 2, one pair of side frames 3, a rear wheel frame 4, a front wheel frame 5, a canopy frame 6, a foot pedal lever 20, one pair of folding links 7, and two springs 8. The handle 1 is made in a substantially U-shaped configuration formed of a corrugated hand-hold portion 11 and two parallel side rods 14. The side rods 14 are extended from the two opposite ends of the corrugated hand-hold portion 11 at right angles with a cross rod 12 connected there-between. The side rods 14 have one pair of holes 13 at suitable locations into which the two opposite ends of the canopy frame 6 are inserted, an upper pair of cushions 141 to which the pair of side frames 3 are connected by rivets 9, an intermediate pair of cushions 142 to which the pair of folding links 7 are connected by rivets 4, a pair of projecting blocks 715 to which the back support frame 72 is connected, and a lower pair of cushions 7143 connected to the rear wheel frame 74 by rivets 9.

The back support frame 2 is made in a substantially U-shaped configuration having two adjustment sheets 21 formed at the two opposite ends thereof respectively connected to the projecting blocks 15 of the handle 1. The two side frames 3 have each one end 31 pivoted to the rear wheel frame 4 and an opposite end 32 pivoted to the handle 1. The rear wheel frame 4 is covered with a cushion sleeve 49 at the top, and has an upper pair of cushions 44 to which the side frames 3 are connected by rivets 9, a pair of connecting sheets 41 to which the front wheel frame 5 are connected, a lower pair of cushions 42 to which the folding links 7 are connected by rivets 9, a transverse wheel axle 43 at the bottom onto which two rear wheels 10 are mounted at two opposite ends and secured in place by locknuts 16. The folding links 7 have each one end 71 respectively pivoted to the intermediate cushions 142 of the handle 1 an intermediate part pivoted to the lower cushions 42 of the rear wheel frame 4, and an opposite end 72 pivoted to the front wheel frame 5. The folding links 7 comprise stub rods 73 onto which the foot pedal lever 20 is hooked. The front wheel frame 5 has two opposite ends 53 respectively connected to the connecting sheets 41 of the rear wheel frame 4 by rivets 9, a pair of cushions 52 at the middle to which the folding links 7 are pivoted, and a transverse wheel axle 51 at the bottom onto which two front wheels 17 are mounted at two opposite ends and secured in place by locknuts 18.

The foot pedal lever 20 has two retaining notches 211 on two locating plates 201 at two opposite ends thereof respectively hooked on the stub rods 53 of the folding links 7. The two springs 8 are respectively connected between the locating plates 201 of the foot pedal lever 20 and the adjustment sheets 21 of the back support frame 2.

In the aforesaid structures, the handle 1, parallel side rods 14, the cross rod 12, the back support frame 2, the rear wheel frame 4, the transverse wheel axle 43, the front wheel frame 5, the transverse wheel axle 51, the two side frames 3, and the folding links 7 are constructed of fiber reinforced plastic matrix composite.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A rollable child carrier structure comprising a rollable base and a multi-side enclosing frame, wherein said frame comprises tubing sections made of lightweight, high modulus fiber-reinforced plastic matrix composite tubing having a weight of 0.35 pounds or less per lineal foot, a tubing diameter of 0.2 to 1.5 inches, a tubing thickness of 0.03 to 0.15 inches, a single fiber angle of 20° to 50°, and fabricated from a single tow or at least one sheet of fibers and wherein said plastic matrix is a thermoplastic resin or thermoset plastic resin with a minimum modulus of 250,000 psi; a minimum tensile strength of 6,000 psi; and a glass transition temperature of at least 50° C. and wherein said high modulus fiber reinforcement is selected from the group consisting of carbon fibers, aramid fibers, glass fibers, polyolefin fibers, boron fibers, and mixtures thereof.

2. The structure of claim 1 wherein said plastic matrix is an epoxy thermoset plastic.

3. The structure of claim 1 wherein said plastic matrix is a nylon thermoplastic resin with a minimum modulus of 325,000 psi and a minimum tensile strength of 10,000 and a thermoplastic resin $T_g$ of at least 75° C.

4. The structure of claim 1 wherein ratio of high modulus fibers to plastic matrix is from 70:30 to 30:70 by volume.

5. The structure of claim 1 wherein said composite tubing is constructed by filament winding.

6. The structure of claim 1 wherein said composite tube is constructed by a pultrusion process.

7. The structure of claim 1 wherein the high modulus fibers are carbon fibers.

8. A rollable child carrier made of the composite tubings of claim 1 and connective fittings, supports, and folding mechanisms consisting of molded plastics containing lightening fillers, whose density is no more than 0.9 grams per cubic centimeter.

9. The structure of claim 1 wherein said composite tubing has a weight of 0.17 pounds or less per lineal foot, a tubing diameter from 0.2 to about 0.9 inches, a tubing wall thickness of 0.04 to 0.09 inches and a single fiber angle of 25° to 45.

10. The structure of claim 1 wherein said composite tubing has a weight of 0.10 pounds or less per lineal foot, a tubing diameter from about 0.4 to about 0.8 inches, a tubing wall thickness of about 0.05 to 0.07 inches, and a single fiber angle of 30° to 40°.

11. A rollable child carrier structure comprising a rollable base and a multi-side enclosing frame, wherein said frame comprises tubing sections made of lightweight, high modulus fiber-reinforced plastic matrix composite tubing having a weight of 0.35 pounds or less per lineal foot, and wherein said plastic matrix is a thermoplastic resin or thermoset plastic resin with a minimum modulus of 250,000 psi; a minimum tensile strength of 6,000 psi; and a glass transition temperature of at least 50° C. and wherein said high modulus fiber reinforcement is selected from the group consisting of carbon fibers, aramid fibers, glass fibers, polyolefin fibers, boron fibers, and mixtures thereof.

12. The structure of claim 11 wherein said plastic matrix is an epoxy thermoset plastic.

13. The structure of claim 11 wherein said plastic matrix is a nylon thermoplastic resin with a minimum modulus of 325,000 psi and a minimum tensile strength of 10,000 and a thermoplastic resin $T_g$ of at least 75° C.

14. The structure of claim 11 wherein ratio of high modulus fibers to plastic matrix is from 70:30 to 30:70 by volume.

15. The structure of claim 11 wherein said composite tubing is constructed by filament winding.

16. The structure of claim 11 wherein said composite tube is constructed by a pultrusion process.

17. The structure of claim 11 wherein the high modulus fibers are carbon fibers.

18. A rollable child carrier made of the composite tubing sections of claim 11 and connective fittings, supports, and folding mechanisms consisting of molded plastics containing lightening fillers, whose density is no more than 0.9 grams per cubic centimeter.

* * * * *